(12) United States Patent
Gilboa-Freedman et al.

(10) Patent No.: US 7,991,721 B2
(45) Date of Patent: Aug. 2, 2011

(54) DIFFERENTIAL AVAILABILITY DETERMINATION AND NOTIFICATION

(75) Inventors: Gail Gilboa-Freedman, Haifa (IL); Natalia Marmasse, Kibbutz Givat Haim Ichud (IL); Vladimir Soroka, Carmiel (IL)

(73) Assignee: International Business Machines Corporation, Armonk, NY (US)

(*) Notice: Subject to any disclaimer, the term of this patent is extended or adjusted under 35 U.S.C. 154(b) by 1611 days.

(21) Appl. No.: 11/268,223

(22) Filed: Nov. 7, 2005

(65) Prior Publication Data

US 2007/0104217 A1 May 10, 2007

(51) Int. Cl.
*G06F 17/00* (2006.01)
*G06N 5/00* (2006.01)

(52) U.S. Cl. .............................. 706/45; 706/20; 706/21

(58) Field of Classification Search .................. None
See application file for complete search history.

(56) References Cited

U.S. PATENT DOCUMENTS

| 5,333,256 | A * | 7/1994 | Green et al. | 715/772 |
|---|---|---|---|---|
| 5,953,393 | A * | 9/1999 | Culbreth et al. | 379/88.25 |
| 2001/0023182 | A1 | 9/2001 | Bach et al. | |
| 2002/0083136 | A1 | 6/2002 | Whitten, II | |
| 2003/0065779 | A1 | 4/2003 | Malik et al. | |
| 2004/0267887 | A1 | 12/2004 | Berger et al. | |
| 2005/0021485 | A1 | 1/2005 | Nodelman et al. | |
| 2005/0055405 | A1 | 3/2005 | Kaminsky et al. | |
| 2005/0184875 | A1 | 8/2005 | Schmandt et al. | |

FOREIGN PATENT DOCUMENTS

WO WO02063486 8/2002

OTHER PUBLICATIONS

Siljee et al., J., "A Context Architecture for Service-Centric Systems", May 2005.*
Dourish et al., Paul, "Awareness and Coordination in Shared Workspaces", Nov. 1992.*
Clarkson et al., Brian, "Recognizing User Context via Wearable Sensors", 2000.*
Marmasse et al., Natalia, "WatchMe: Communication and Awareness Between Members of a Closely-Knit Group", Oct. 2004.*
Dini et al., Petre, "Performance Evaluation for Distributed System Components", 1996.*
Anhalt et al., J. "Toward Context-Aware Computing: Experiences and Lessons", IEEE Intelligent Systems, pp. 38-46, 2001.*
Natalia Marmasse, Chris Schmandt, David Spectre: WatchMe: "Communication and Awareness Between Members of a Closely-Knit Group". Ubicomp 2004.
John Richards and Jim Christensen: "People in our Software". ACM Queue vol. 1, No. 10, Feb. 2004.
U.S. Appl. No. 10/132,404, filed Apr. 25, 2002.
U.S. Appl. No. 10/171,585, filed Jun. 13, 2002.

(Continued)

Primary Examiner — Jeffrey A Gaffin
Assistant Examiner — Adrian L Kennedy (57) ABSTRACT

A method for determining differential availability, the method including identifying a current context of a first entity, and determining a current availability value of the first entity with respect to a second entity in accordance with an availability function, where the availability function is adaptive in accordance with an adaptation process to at least one past actual availability value of the fist entity with respect to the second entity in a previous context at least partially related to the current context, and where the availability function is operative to determine the current availability value as a function of the current context.

19 Claims, 7 Drawing Sheets

OTHER PUBLICATIONS

U.S. Appl. No. 10/720,878, filed Jan. 13, 2000.
U.S. Appl. No. 11/064,921, filed Feb. 24, 2004.
Eric Horvitz, Paul Koch, Johnson Apacible. "BusyBody: Creating and Fielding Personalized Models of the Cost of Interruption". CSCW 2004.
James "Bo" Begole, John Tang, Rosco Hill. "Rhythm Modeling, Visualizations and Applications". UIST 2003.
Eric Horvitz, Paul Koch, Carl Kadie, Andy Jacobs. "Coordinate: Probabilistic Forecasting of Presence and Availability". UAI 2002.
James "Bo" Begole, John Tang, Randall Smith, Nicole Yankelovich. "Awareness Histories of Distributed Groups". CSCW 2002.
Eric Horvitz, Andy Jacobs, David Hovel. "Attention-Sensitive Alerting". UAI 1999.

\* cited by examiner

DIFFERENTIAL AVAILABILITY DETERMINATION AND NOTIFICATION

FIELD OF THE INVENTION

The present invention relates to systems that display presence information in general, and more particularly to determining differential availability and providing notification therefor via computer or telecommunications networks.

BACKGROUND OF THE INVENTION

Communication services, instant messaging tools, and other applications often provide users with presence information regarding the current availability of other users. However, such presence information is deficient in several ways. For example, a user's availability is typically characterized with respect to a limited number of situations, such as whether a user is active, idle, or offline. A user's level/degree of availability is also typically person agnostic, and is not based on communication history. The operation of some presence information systems raises privacy issues by exposing a user's context to other users with availability characterizations such as "on the phone" or "in his office."

SUMMARY OF THE INVENTION

The present invention discloses a system and method for determining and communicating differential availability, where a subject's availability with respect to another party is determined with respect to the subject's past communication behavior in various contexts and/or with various parties.

In another aspect of the present invention a method is provided for determining differential availability, the method including identifying a current context of a first entity, and determining a current availability value of the first entity with respect to a second entity in accordance with an availability function, where the availability function is adaptive in accordance with an adaptation process to at least one past actual availability value of the first entity with respect to the second entity in a previous context at least partially related to the current context, and where the availability function is operative to determine the current availability value as a function of the current context.

In another aspect of the present invention the method further includes providing to the second entity a notification of the current availability of the first entity with respect to the second entity, where the notification is a representation of the current availability value.

In another aspect of the present invention any of the entities is any of a person, a process, a machine, and a collection of data.

In another aspect of the present invention the method further includes adapting the availability function in relation to the difference between the current availability value and an actual availability value.

In another aspect of the present invention the identifying step includes determining any of the current location of the first entity, an activity in which the first entity is currently engaged, and either of a date and a time at the current location of the first entity.

In another aspect of the present invention the determining step includes determining where the past actual availability value is a measure of a communication interaction between the first entity and the second entity in the previous context.

In another aspect of the present invention the determining step includes determining where the communication interaction is either of a synchronous communication interaction and an asynchronous communication interaction.

In another aspect of the present invention the determining step includes determining where the communication interaction is defined as either of a) the first entity accepting a communication initiated by the second entity, and b) the first entity initiating a communication to the second entity.

In another aspect of the present invention the determining step includes determining where the measure indicates either of a) whether the first entity previously answered a telephone call from the second entity in the previous context, and b) a response time by the first entity to a computer-based chat prompt by the second entity.

In another aspect of the present invention the providing step includes providing the notification in the form of any of a) a continuous spectrum icon whose color varies in accordance with different availability values, b) a color icon whose color intensity varies in accordance with different availability values, c) an index and a scale, where the position of the index relative to the scale varies in accordance with different availability values, and d) the current availability value expressed on a continuous scale.

In another aspect of the present invention a system is provided for differential availability determination, including a behavior sensor operative to identify a current context of a first entity, an availability determinator operative to determine a current availability value of the first entity with respect to a second entity in accordance with an availability function applied to the current context, and an adaptation processor operative to adapt the availability function in accordance with an adaptation process to at least one past actual availability value of the first entity with respect to the second entity in a previous context at least partially related to the current context.

In another aspect of the present invention the system further includes means for providing to the second entity a notification of the current availability of the first entity with respect to the second entity, where the notification is a representation of the current availability value.

In another aspect of the present invention any of the entities is any of a person, a process, a machine, and a collection of data.

In another aspect of the present invention the adaptation processor is operative to adapt the availability function in relation to the difference between the current availability value and an actual availability value.

In another aspect of the present invention the availability determinator is operative to determine any of the current location of the first entity, an activity in which the first entity is currently engaged, and either of a date and a time at the current location of the first entity.

In another aspect of the present invention the past actual availability value is a measure of a communication interaction between the first entity and the second entity in the previous context.

In another aspect of the present invention the communication interaction is defined as either of a) the first entity accepting a communication initiated by the second entity, and b) the first entity initiating a communication to the second entity.

In another aspect of the present invention the measure indicates either of a) whether the first entity previously answered a telephone call from the second entity in the previous context, and b) a response time by the first entity to a computer-based chat prompt by the second entity.

In another aspect of the present invention the notification is provided in the form of any of a) a continuous spectrum icon whose color varies in accordance with different availability values, b) a color icon whose color intensity varies in accordance with different availability values, c) an index and a scale, where the position of the index relative to the scale varies in accordance with different availability values, and d) the current availability value expressed on a continuous scale.

In another aspect of the present invention a computer-implemented program is provided embodied on a computer-readable medium, the computer program including a first code segment operative to identify a current context of a first entity, and a second code segment operative to determine a current availability value of the first entity with respect to a second entity in accordance with an availability function, where the availability function is adaptive in accordance with an adaptation process to at least one past actual availability value of the first entity with respect to the second entity in a previous context at least partially related to the current context, and where the availability function is operative to determine the current availability value as a function of the current context.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Figure 1:
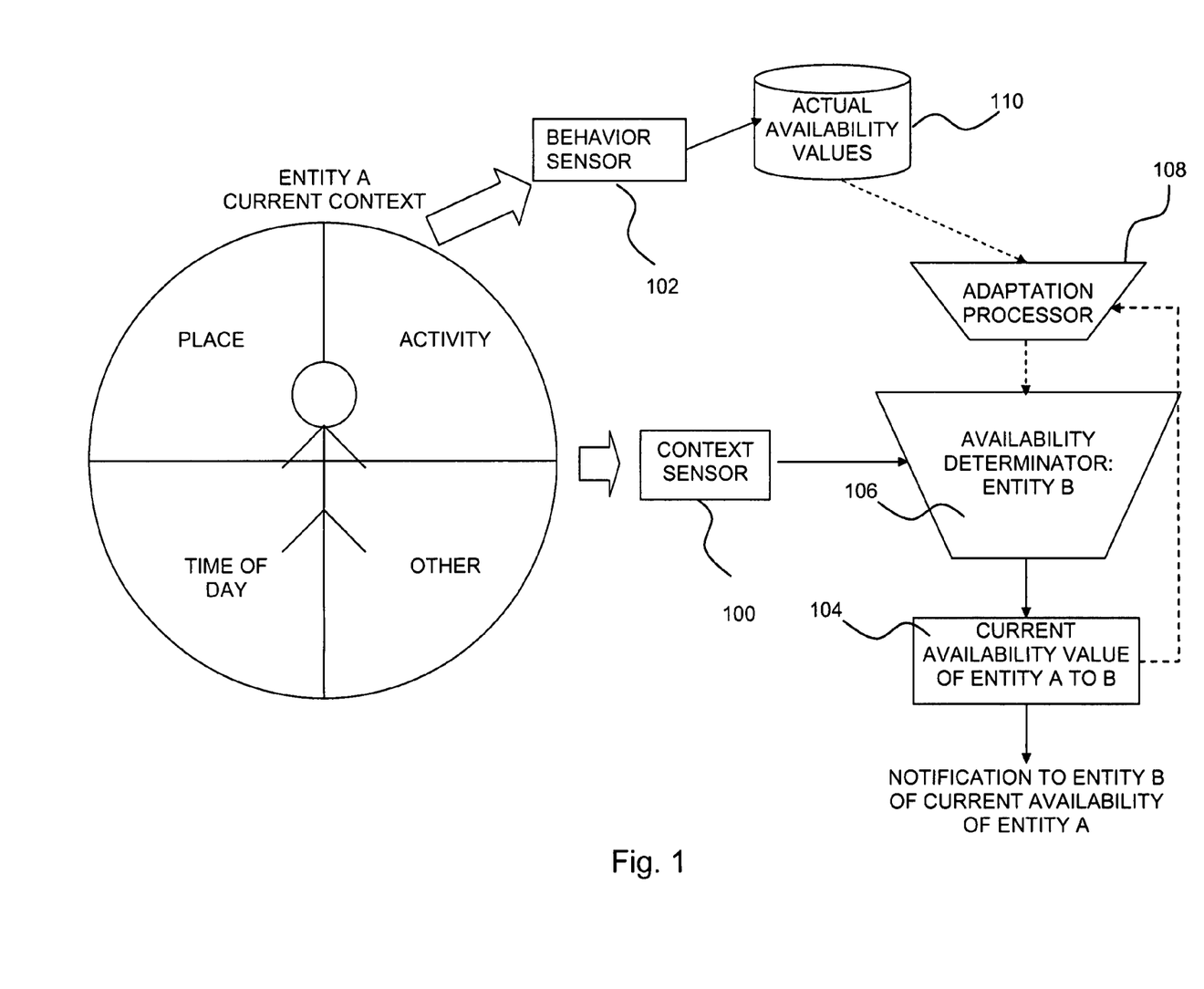
FIG. 1 is a simplified conceptual illustration of a differential availability notification system, constructed and operative in accordance with a preferred embodiment of the present invention.
Figure 2:
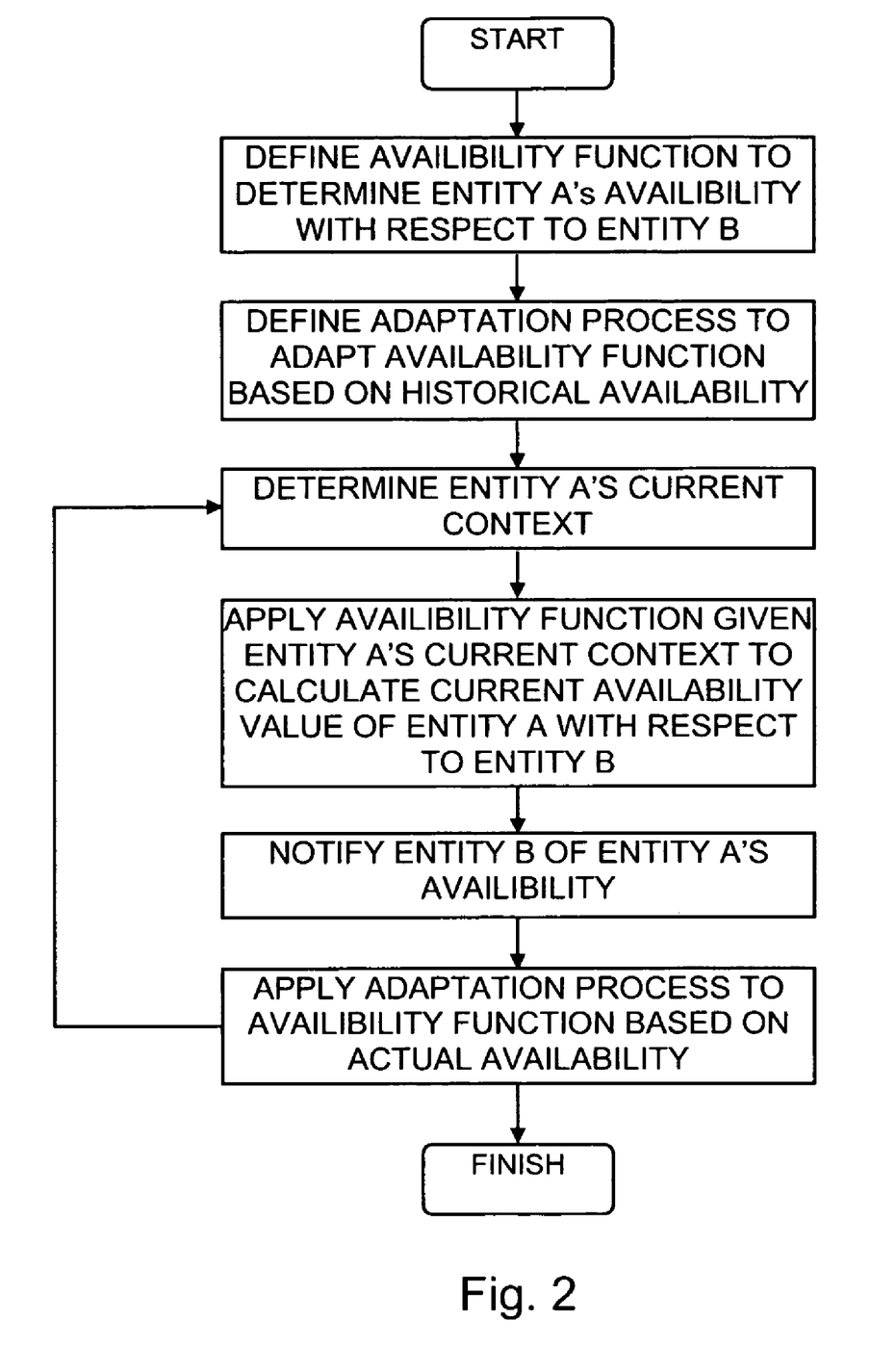
FIG. 2 is a simplified flowchart illustration of an exemplary method of operation of the system of FIG. 1, operative in accordance with a preferred embodiment of the present invention.

Reference is now made to FIG. 1, which is a simplified conceptual illustration of a differential availability notification system, constructed and operative in accordance with a preferred embodiment of the present invention, and additionally to FIG. 2, which is a simplified flowchart illustration of an exemplary method of operation of the system of FIG. 1, operative in accordance with a preferred embodiment of the present invention. In the system and method of FIGS. 1 and 2, the current context of a first entity A is determined, such as by a context sensor 100 which preferably provides the current context information to a computer for processing as described herein. Entity A may, for example, be a person, a computer user, a telephone user, a computer process, a machine, a collection of data, or any other thing for which presence information may be measured and is useful. The "context" of an entity may, for example, refer to the entity's current physical location, an activity in which the entity is currently engaged (e.g., working, driving), or the current date and/or time at the entity's current location, and may be a combination of such contexts (e.g., driving, and it's 3 p.m.). Context sensor 100 may be any mechanism for determining the context of entity A, such as a card-key system indicating entity A's location or a computer-based calendar indicating appointments and meetings for entity A. It is appreciated that an entity's context may be measured using any level of data abstraction or granularity.

A current availability value 104 of entity A may be calculated with respect to an entity B to determine the extent to which entity A is available to entity B. Current availability value 104 is calculated using an availability determinator 106, which employs an adaptive function. It will be appreciated that entity A may have different current availability values with respect to different entities (B, C, . . . ), where each current availability value is separately and independently calculated for a given entity using a different availability function maintained for each entity. Availability determinator 106 applies an availability function to the current context of entity A to generate current availability value 104. Thus, for example, if entity A's current context is "morning, at work, participating in a meeting," and in the past, based on sufficient sampling of entity A's past actual behavior, entity A answered 90% telephone calls from entity B (e.g., his boss) when in this context, and from C (e.g., his friend) only 10% of the time, then the current availability of entity A would be higher with respect to entity B than with respect to entity C. A's availability during the meeting may be 0.8 with respect to his boss and only 0.05 with respect to his friend.

The availability function of availability determinator 106 may be modified in relation to the difference between one or more calculated availability values 104 and corresponding actual availability values 110 of entity A with respect to entity B in one or more previous contexts that are partly or wholly related to the entity A's current context. Actual availability value 110 may be expressed as a measure of past actual availability behavior of entity A, such as of a positive or negative communication interaction between entity A and entity B, as may be determined by a behavior sensor 102. A positive communication interaction between A and B may describe such cases as A accepting a communication initiated by B, or A initiating a communication to B, although these cases may be weighted differently. For example, entity A's availability value with respect to entity B might indicate that entity A should be available to entity B in a given context, yet entity A's actual behavior shows that entity A didn't answer a telephone call from entity B. Alternatively, entity A might actually answer a call from entity B despite determining a low availability value for entity A. The communication interaction may be synchronous, such as where entity A answers a telephone call or chat prompt from entity B, in which case the behavior measurement may indicate whether or not entity A answered the telephone call or chat prompt or entity A's response time. Alternatively, the communication interaction may be asynchronous, such as where entity A responds to an email sent by entity B, in which case the behavior measurement may indicate whether or not entity A answered the email or how long until entity A responded. Thus, continuing with the previous example, if entity A's current context is "morning, at work, participating in a meeting," and in the past entity A rarely (e.g., ~10%) answered telephone calls from entity C in this context but recently started answering all the telephone call from entity C while participating in a meeting (e.g., A answered B's last 10 calls), then the availability function for entity B may be adapted accordingly, and entity A's current availability with respect to entity B may be increased on it's continuous scale between 0 and 1 (e.g., may increase from 0.05 to 0.6).

Behavior sensor 102 may be any mechanism for determining the behavior of entity A with respect to a communication interaction, such as any known mechanism for determining whether or not entity A answers a telephone call, a chat, or an email, or whether entity A initiated a telephone call, a chat, etc. It is appreciated that an entity's behavior may be measured using any level of data abstraction or granularity.

Thus, in the system and method of FIGS. 1 and 2, entity A's availability in a specific context to entity B is characterized, and can therefore be learned. By observing and learning entity A's interactions, reactive and/or proactive, with different entities in different contexts, the system adaptively and differentially determines entity A's availability over time.

Once availability determinator 106 has determined the current availability value 104 of entity A, a notification of current availability value 104 may be provided to entity B via a computer network or a telecommunications network, such as to a cellular telephone. Current availability value 104 may be represented in the form of a color icon or continuous spectrum icon whose color or color intensity varies in accordance with different availability values. Alternatively, current availability value 104 may be represented in the form of an index and a scale, where the position of the index relative to the scale varies in accordance with different availability values.

Figure 5A:
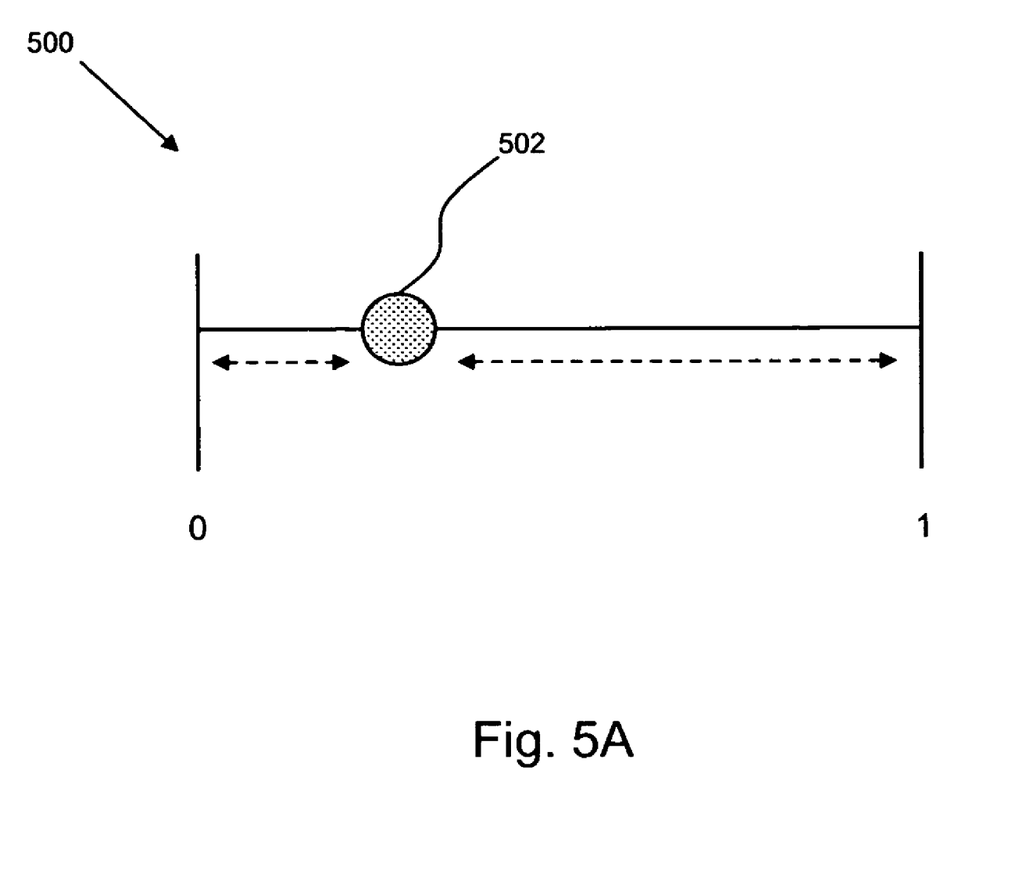
FIGS. 5A-5C are simplified illustrations of exemplary modes of differential availability notification, constructed and operative in accordance with a preferred embodiment of the present invention.
Figure 5B:
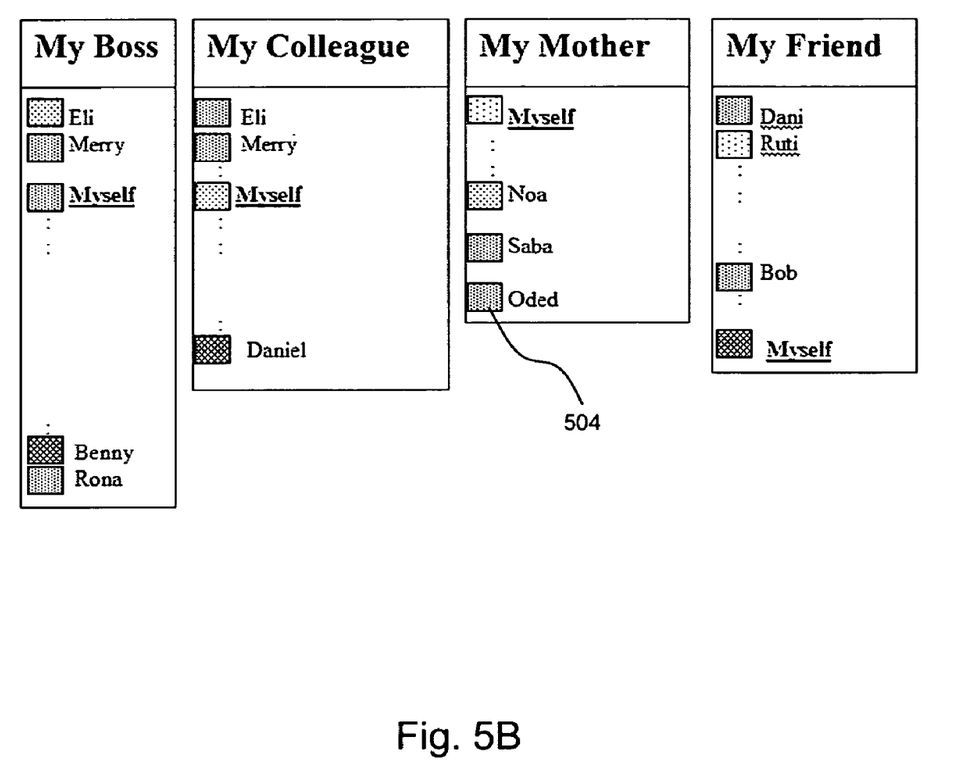
Figure 5C:
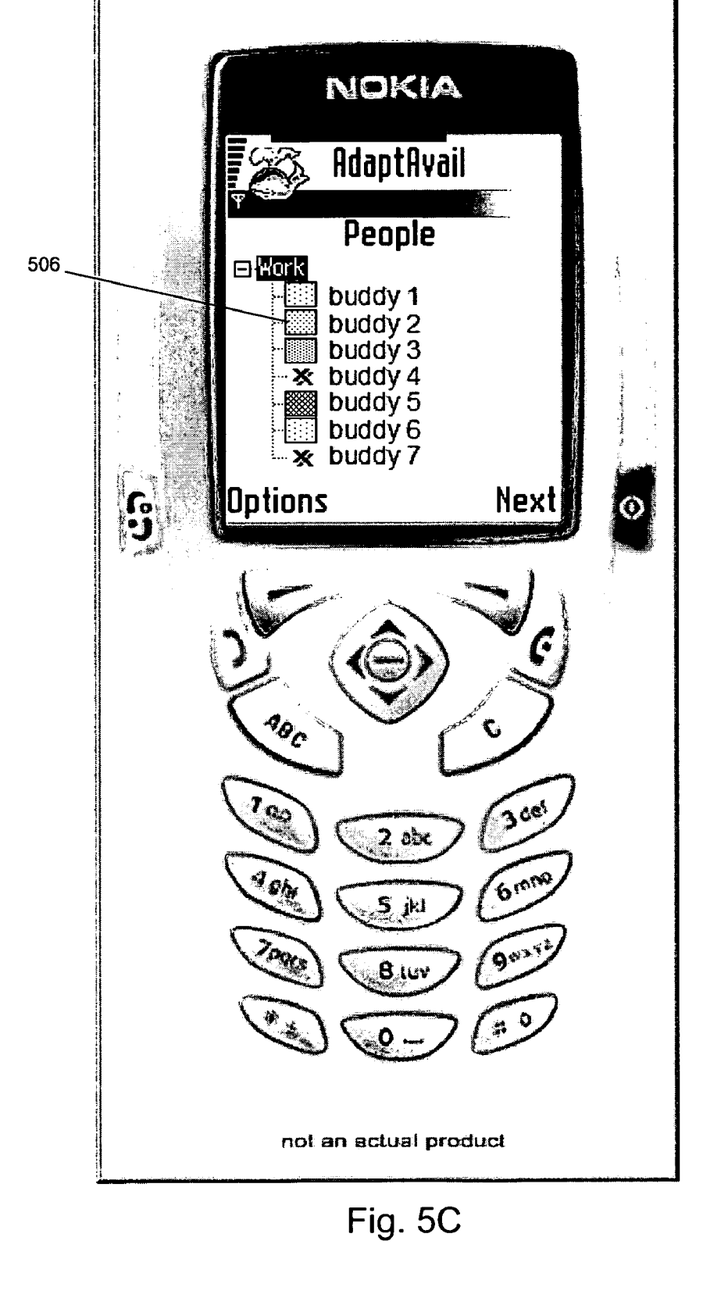

The system and method of FIGS. 1 and 2 may be understood by way of example, such as in a network-based chat system. Initially, a user A's availability is the same with respect to other users on his "buddy list." When user A is online and active, his availability would be represented in the same manner to each of his buddies, such as via a green icon. Over time, the system observes both user A in multiple contexts, as well as his communication interactions with each of his buddies. These observations enable it to learn user A's actual availability with regard to each of his buddies in the different contexts and, using a predefined adaptation process, adapt a different predefined availability function for each of his buddies to reflect these interactions, enabling the system to compute a degree of availability for each user on his buddy list. Thus, for example, user A may appear to be very available to user X, somewhat available to user Y, yet at the same time unavailable to user Z. The degree of availability may be expressed as a continuous number between 0 and 1, such as is shown via a scale 500 in FIG. 5A, and may be visualized as an icon 502 with corresponding varying color and/or intensity, such as is alternatively shown in FIGS. 5B and 5C, with icons 504 and 506 having varying color and/or intensity as represented by different levels of shading for illustration purposes, where a darker color/shading might represent greater availability, while a lighter color/shading might represent lesser availability. FIG. 5B shows a subject's different degrees of availability being presented with different colors towards different parties. FIG. 5C shows how differential availability might be presented on a mobile telephone display.

The learning process may be implemented using conventional neural network algorithms. As the availability of user A varies for each buddy on his list, separate neural networks are preferably employed for each buddy. The input of these neural networks are data that may be received from multiple sources, such as raw data from sensors abstracted to meaningful levels (e.g., GPS coordinates translated to locations), user A's calendar (e.g., indicating his assumed location and activity), the time of day at user A's location, and/or other sources of location and activity information. The availability function implemented by a neural network may be adapted by changing the synaptic weights by an amount proportional to the difference between previously calculated availability values and actual availability values.

Figure 3:
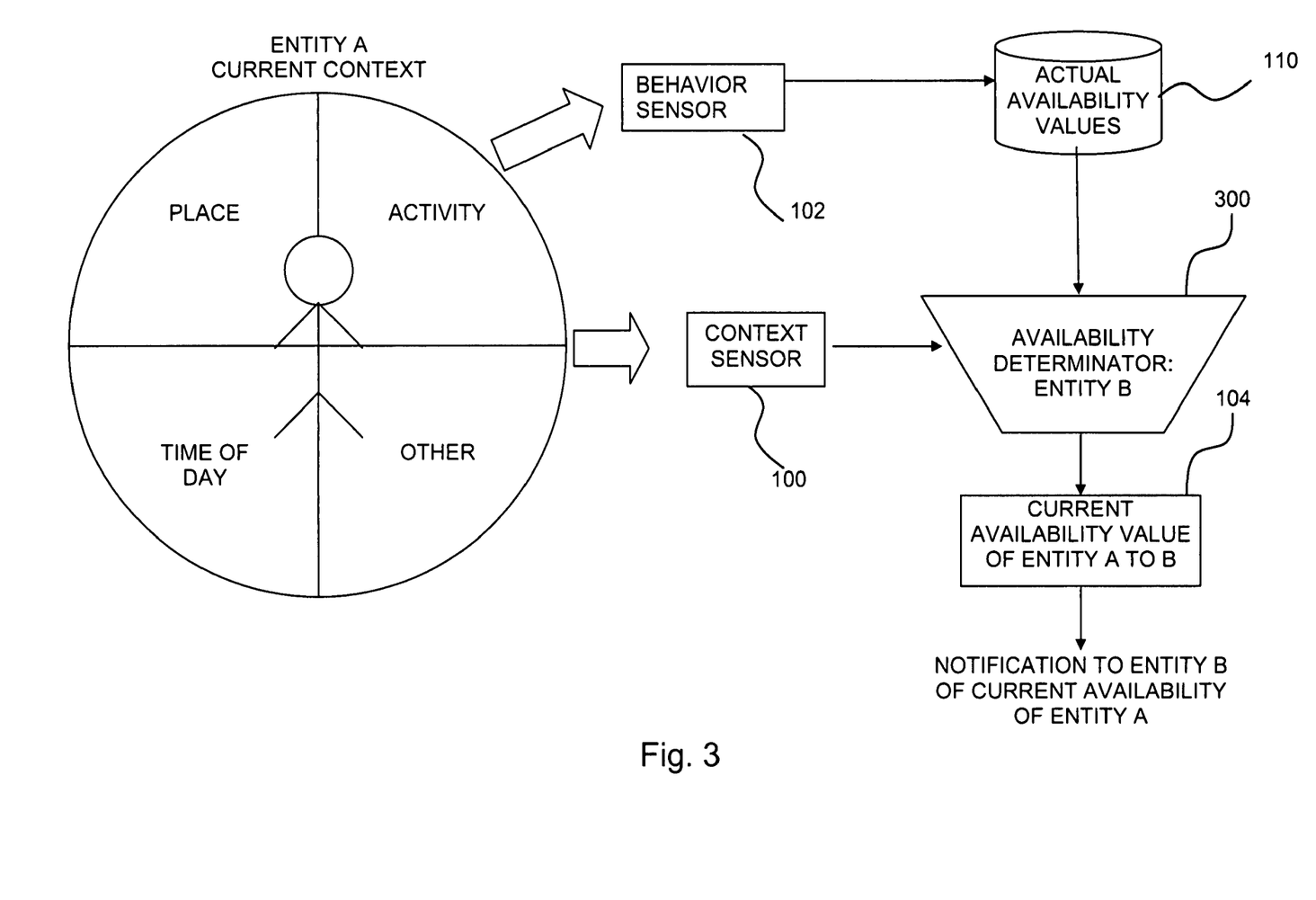
FIG. 3 is a simplified conceptual illustration of an alternative differential availability notification system, constructed and operative in accordance with a preferred embodiment of the present invention.
Figure 4:
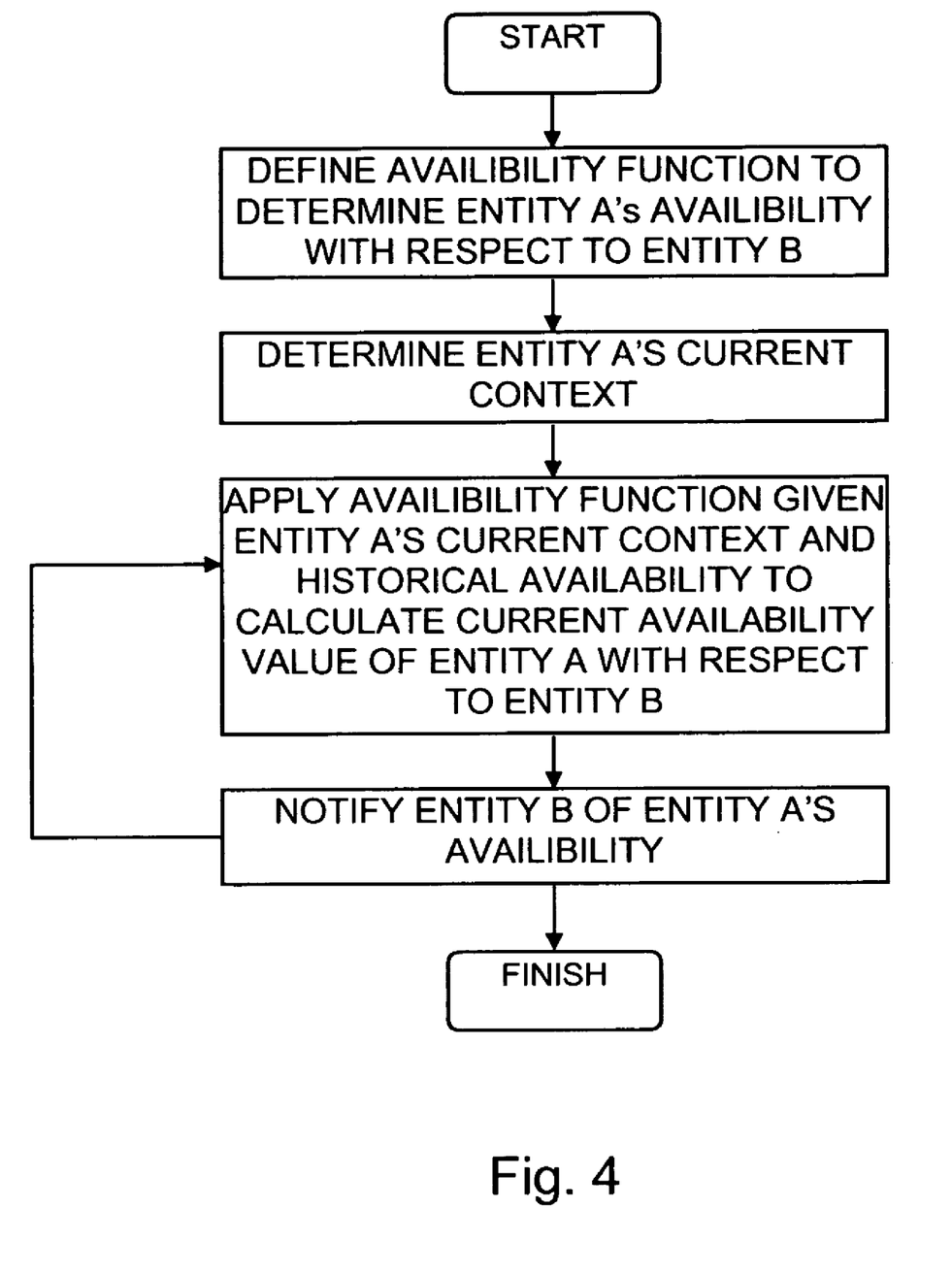
FIG. 4 is a simplified flowchart illustration of an exemplary method of operation of the system of FIG. 3.

Reference is now made to FIG. 3, which is a simplified conceptual illustration of a differential availability notification system, constructed and operative in accordance with a preferred embodiment of the present invention, and additionally to FIG. 4, which is a simplified flowchart illustration of an exemplary method of operation of the system of FIG. 3, operative in accordance with a preferred embodiment of the present invention. The system and method of FIGS. 3 and 4 are substantially similar to the system and method of FIGS. 1 and 2 with the notable exception that an availability determinator 300 is provided in place of availability determinator 106, and no adaptation processor 108 is provided. Availability determinator 300 determines current availability value 104 by employing a function of the temporal context, such as may be received from context sensor 100, and of one or more past actual availability values 110 of entity A with respect to said entity B in one or more previous contexts that are partly or wholly related to the entity A's current context. In contrast to availability determinator 106 in FIGS. 1 and 2, availability determinator 300 receives actual availability values 110 as a direct input, and not only as a factor used to modify the availability function as part of a learning process.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for determining differential availability, the method comprising:

a) identifying, using a context sensor, a current context of a first entity;

b) determining a current availability value of said first entity with respect to a second entity in accordance with an availability function maintained for said second entity;

c) notifying said second entity of said current availability value of said first entity with respect to said second entity by presenting a representation of said current availability value of said first entity with respect to said second entity via a computer-controlled output medium, wherein said current availability value of said first entity with respect to said second entity indicates a likelihood that said first entity will communicate with said second entity responsive to a communication request sent by said second entity to said first entity, wherein said availability function maintained for said second entity is adaptive in accordance with an adaptation process to at least one past actual availability value of said first entity with respect to said second entity in a previous context at least partially related to said current context, and wherein said availability function maintained for said second entity is operative to determine said current availability value of said first entity with respect to said second entity as a function of said current context;

d) determining a current availability value of said first entity with respect to a third entity in accordance with an availability function maintained for said third entity; and e) notifying said third entity of said current availability value of said first entity with respect to said third entity by presenting a representation of said current availability value of said first entity with respect to said third entity via a computer-controlled output medium, wherein said current availability value of said first entity with respect to said third entity indicates a likelihood that said first entity will communicate with said third entity responsive to a communication request sent by said third entity to said first entity, wherein said availability function maintained for said third entity is different from said availability function used to determine said current availability value of said first entity with respect to said second entity, wherein said availability function maintained for said third entity is adaptive in accordance with an adaptation process to at least one past actual availability value of said first entity with respect to said third entity in a previous context at least partially related to said current context, and wherein said availability function maintained for said third entity is operative to determine said current availability value of said first entity with respect to said third entity as a function of said current context.

2. A method according to claim 1 wherein any of said entities is any of a person, a process, a machine, and a collection of data.

3. A method according to claim 1 and further comprising adapting any of said availability functions in relation to the difference between any of said current availability values and an actual availability value.

4. A method according to claim 1 wherein said identifying step a) comprises determining any of the current location of said first entity, an activity in which said first entity is currently engaged, and either of a date and a time at the current location of said first entity.

5. A method according to claim 1 wherein said determining step b) comprises determining where said past actual availability value of said first entity with respect to said second entity is a measure of a communication interaction between said first entity and said second entity in said previous context.

6. A method according to claim 5 wherein any of said determining steps comprises determining where said communication interaction is either of a synchronous communication interaction and an asynchronous communication interaction.

7. A method according to claim 6 wherein said determining step b) comprises determining where said communication interaction is defined as either of a) said first entity accepting a communication initiated by said second entity, and b) said first entity initiating a communication to said second entity.

8. A method according to claim 5 wherein said determining step b) comprises determining where said measure indicates either of a) whether said first entity previously answered a telephone call from said second entity in said previous context, and b) a response time by said first entity to a computer-based chat prompt by said second entity.

9. A method according to claim 1 wherein said notifying step c) comprises presenting said representation in the form of any of a) a continuous spectrum icon whose color varies in accordance with different availability values, b) a color icon whose color intensity varies in accordance with different availability values, c) an index and a scale, where the position of said index relative to said scale varies in accordance with different availability values, and d) said current availability value expressed on a continuous scale.

10. A differential availability determination system comprising:

a context sensor operative to identify a current context of a first entity;

an availability determinator operative to determine a current availability value of said first entity with respect to a second entity in accordance with an availability function maintained for said second entity and applied to said current context, wherein said current availability value of said first entity with respect to said second entity indicates a likelihood that said first entity will communicate with said second entity responsive to a communication request sent by second entity to said first entity, notify said second entity of said current availability value of said first entity with respect to said second entity by presenting a representation of said current availability value of said first entity with respect to said second entity via a computer-controlled output medium, determine a current availability value of said first entity with respect to a third entity in accordance with an availability function maintained for said third entity and applied to said current context, wherein said current availability value of said first entity with respect to said third entity indicates a likelihood that said first entity will communicate with said third entity responsive to a communication request sent by said third entity to said first entity, and notify said third entity of said current availability value of said first entity with respect to a third entity by presenting a representation of said current availability value of said first entity with respect to said third entity via a computer-controlled output medium; and an adaptation processor operative to adapt said availability function maintained for said second entity in accordance with an adaptation process to at least one past actual availability value of said first entity with respect to said second entity in a previous context at least partially related to said current context, and adapt said availability function maintained for said third entity in accordance with an adaptation process to at least one past actual availability value of said first entity with respect to said third entity in a previous context at least partially related to said current context.

11. A system according to claim 10 wherein any of said entities is any of a person, a process, a machine, and a collection of data.

12. A system according to claim 10 wherein said adaptation processor is operative to adapt any of said availability functions in relation to the difference between any of said current availability values and an actual availability value.

13. A system according to claim 10 wherein said availability determinator is operative to determine any of the current location of said first entity, an activity in which said first entity is currently engaged, and either of a date and a time at the current location of said first entity.

14. A system according to claim 10 wherein said past actual availability value of said first entity with respect to said second entity is a measure of a communication interaction between said first entity and said second entity in said previous context.

15. A system according to claim 14 wherein said communication interaction is defined as either of a) said first entity accepting a communication initiated by said second entity, and b) said first entity initiating a communication to said second entity.

16. A system according to claim 14 wherein said measure indicates either of a) whether said first entity previously answered a telephone call from said second entity in said previous context, and b) a response time by said first entity to a computer-based chat prompt by said second entity.

17. A system according to claim 10 wherein said representations are provided in the form of any of a) a continuous spectrum icon whose color varies in accordance with different availability values, b) a color icon whose color intensity varies in accordance with different availability values, c) an index and a scale, where the position of said index relative to said scale varies in accordance with different availability values, and d) said current availability value expressed on a continuous scale.

18. A computer-implemented program embodied on a computer-readable medium, the computer program comprising:
   a first code segment operative to identify a current context of a first entity;
   a second code segment operative to
      determine a current availability value of said first entity with respect to a second entity in accordance with an availability function maintained for said second entity, wherein said current availability value of said first entity with respect to said second entity indicates a likelihood that said first entity will communicate with said second entity responsive to a communication request sent by said second entity to said first entity, and
      notify said second entity of said current availability value of said first entity with respect to said second entity by presenting a representation of said current availability value of said first entity with respect to said second entity via a computer-controlled output medium,
         wherein said availability function maintained for said second entity is adaptive in accordance with an adaptation process to at least one past actual availability value of said first entity with respect to said second entity in a previous context at least partially related to said current context, and
         wherein said availability function maintained for said second entity is operative to determine said current availability value as a function of said current context; and
   a third code segment operative to
      determine a current availability value of said first entity with respect to a third entity in accordance with an availability function maintained for said third entity, wherein said current availability value of said first entity with respect to said third entity indicates a likelihood that said first entity will communicate with said third entity responsive to a communication request sent by said third entity to said first entity, and
      notify said third entity of said current availability value of said first entity with respect to said third entity by presenting a representation of said current availability value of said first entity with respect to said third entity via a computer-controlled output medium,
         wherein said availability function maintained for said third entity is adaptive in accordance with an adaptation process to at least one past actual availability value of said first entity with respect to said third entity in a previous context at least partially related to said current context,
         wherein said availability function maintained for said third entity is operative to determine said current availability value as a function of said current context, and
         wherein said availability function maintained for said third entity is different from said availability function used to determine said current availability value of said first entity with respect to said second entity.

19. A method according to claim 1 wherein said identifying, determining, and notifying steps are implemented in either of
   a) computer hardware, and
   b) computer software embodied in a computer-readable medium.

* * * * *